United States Patent [19]
Schlaepfer

[11] 4,204,610
[45] May 27, 1980

[54] METHOD OF FILLING BLIND HOLES IN A STENCIL

[75] Inventor: Robert J. Schlaepfer, Niederteufen Ar, Switzerland

[73] Assignee: Jacob Schlaepfer & Co. AG, St. Gallen, Switzerland

[21] Appl. No.: 832,702

[22] Filed: Sep. 12, 1977

[30] Foreign Application Priority Data

Sep. 15, 1976 [GB] United Kingdom ............... 38252/76

[51] Int. Cl.[2] ............................................. B65G 59/06

[52] U.S. Cl. ......................................... 221/1; 53/246; 156/235; 156/238; 156/297; 221/171; 414/781; 414/786

[58] Field of Search ............... 156/297, 299, 300, 301, 156/235, 238, 560, 562; 221/156, 171, 173, 160, 266, 1, 163; 414/112, 125, 131, 768, 770, 780, 781, 782, 786; 29/744; 112/404, 439; 53/246, 247

[56] References Cited

U.S. PATENT DOCUMENTS

| | | | |
|---|---|---|---|
| 1,763,494 | 6/1930 | Yinger | 156/297 X |
| 2,862,846 | 12/1958 | Blackford et al. | 156/300 X |
| 3,578,140 | 5/1971 | Myer | 221/173 X |
| 3,871,295 | 3/1975 | Ackley | 221/173 X |

FOREIGN PATENT DOCUMENTS 2541633 4/1976 Fed. Rep. of Germany .

OTHER PUBLICATIONS

Manegold et al., Apparatus for Orienting Paramagnetic Articles, Tech. Digest No. 5, Western Electric, Jan. 1967, pp. 15–16.

*Primary Examiner*—John T. Goolkasian
*Assistant Examiner*—Thomas Bokan
*Attorney, Agent, or Firm*—Edwin E. Greigg

[57] ABSTRACT

The present invention is concerned with the loading of stencils comprising a plurality of blind bores or holes each adapted to accommodate a decorative article. The stencil is loaded by providing a stack of articles over the stencil and then producing relative translational movement between the stack and the stencil to deposit an article in each hole. Each article is of asymmetric configuration having a generally planar base so that when an article is deposited in a hole base downwards, the article is contained in the hole and when deposited in any other configuration, movement of the stack thereover urges the article out of the hole to allow another article to enter.

5 Claims, 4 Drawing Figures

METHOD OF FILLING BLIND HOLES IN A STENCIL

The present invention relates to transfers for the decoration of sheet materials, and has particular reference to the production of transfers for the application of solid decorative particles such as studs, rhinestones and the like to textile and other sheet materials in the form of predetermined patterns.

The decoration of sheet materials by the application of rhinestones and the like is well known. Hitherto, decorative articles such as sequins, studs, rhinestones, have been applied to sheet materials individually and such a method clearly occupies a great deal of time and is uneconomic for the mass production of garments decorated with such articles.

More recently, various transfers and transfer systems have been proposed for decorating sheet materials in general. For instance, in our U.S. Pat. No. 4,071,387, there is provided a decoration for application to sheet material which comprises a decorative article, a layer of heat activated adhesive applied to a first surface of said article and a carrier sheet adhering to a second surface of said article, which carrier sheet is heat stable at the temperature of activation of said adhesive, whereby on positioning the article with its adhesive surface juxtaposed the sheet material to be decorated the application of heat and pressure activates said adhesive and produces bonding of the article to the sheet material.

In one aspect of the invention described in the aforesaid patent, the article itself may be a solid particulate article such as a rhinestone or a stud. It is generally desirable to apply such articles in the form of patterns, and in consequence it is necessary to provide an initial stencil defining the pattern to lay out the particles within the stencil to obtain the correct relative positioning of the particles within the pattern.

On a commercial process this produces the difficulty of indexing the particles, which have already had the heat-sensitive adhesive applied to one surface thereof, within the stencil in the correct orientation for attachment to a carrier sheet.

According to the present invention, therefore, there is provided a method of loading a stencil for the production of a transfer wherein the stencil has a plurality of holes in the surface thereof each adapted to accommodate a discrete article, said holes serving to define a pattern of articles to be provided on a transfer and each discrete article being of asymmetric configuration such that each article can be accommodated in a stencil hole in a fixed orientation with an upper portion of the article exposed and with a base portion located within said blind hole which method comprises disposing a plurality of said discrete articles on the surface of the stencil and applying localised pressure to the articles, simultaneously moving said plurality of articles over the surface of the stencil so that an article is disposed in each hole, whereby lateral translational movement of the plurality of articles and the associated pressure assists each located article to adopt said fixed orientation.

In this way, the articles may be readily disposed within the stencil in their correct orientation so that by the application of a sheet as a carrier or support sheet having an adhesive layer to the stencil surface to contact the articles so that the articles adhere thereto and removal of said laminating sheet results in removal of the articles from said stencil.

The decorative articles should be of asymmmetric configuration. Each article may have a base portion carrying a layer of heat sensitive adhesive. It is preferred that the localised pressure applied to the plurality of articles disposed on the surface of the stencil is obtained by simply providing a reservoir of articles in which the weight of articles within the reservoir stacked on the surface of the stencil constitutes the downward pressure on the articles themselves, then producing relative translation movement between the stencil and the stack to orientate the articles. In this way, each blind hole in the stencil will be occupied by an article. Since the articles are asymmetric, an article will be stably accommodated within a blind bore if it is base downwards and would be unstably accommodated if it is base upwards. The lateral movement of the stencil with respect to the stack of articles on top will result in the unstable articles being removed from the stencil and further articles being allowed to fall in. Provided the area of coverage of the stack of articles is sufficiently large, all of the blind bores will be occupied by articles in their stable configuration. Continued movement of the transfer and/or stack of particles one relative to the other will result in a transfer completely filled with articles in their stable configuration preparatory for application of a carrier sheet over the exposed surfaces thereof. In this way, the problem of indexing the supply of articles with the accommodating holes in the carrier sheet is substantially overcome.

In a particular embodiment of the present invention, there is provided a method of forming a transfer for applying decorative articles to a sheet material which method comprises forming a stencil having a plurality of blind bores in the surface thereof each adapted to accommodate a decorative article, said holes serving to define a pattern of articles on the transfer, applying a stock of decorative articles of asymmetric configuration, each article capable of being accommodated in a stencil hole of fixed orientation with the decorative portion of the article exposed and a base portion disposed within the hole wherein the base portion of each article carries a heat sensitive adhesive, moving said stack of articles over the surface of the stencil so that an article is disposed in each hole in said fixed orientation, applying a carrier sheet having an adhesive layer to the surface of said stencil to contact said articles so that the articles adhere thereto and thereafter withdrawing the carrier sheet carrying the articles from said stencil.

A backing sheet may be applied to the carrier sheet to protect the articles adhering thereto so that the articles constituting the stencil pattern are sandwiched between the carrier sheet and the backing sheet. Decorative tapes may be laminated to the front of the carrier sheet and may be used to unite the carrier sheet with the backing sheet.

The nature of the carrier sheet and heat-sensitive adhesive has already been disclosed in our U.S. Pat. No. 4,071,387 and features of that patent in connection with the application of solid particles can also by employed in the present invention.

The orientation of the particles and filling of the stencils may be assisted in a number of ways. For instance, the articles may be formed with ferromagnetic bases and a magnetic field may be applied to the stencil to assist orientation of the articles.

In another embodiment of the present invention the base of each article may be made of a slightly heavier material to assist orientation.

Typical articles are studs, rhinestones, sequins, nail heads and the like, all of which can be employed in the process of the present invention. The invention also includes transfers when made by the method of the invention.

Following is a description by way of example only with reference to the accompanying informal drawings of methods of carrying the invention into effect.

Figure 1:
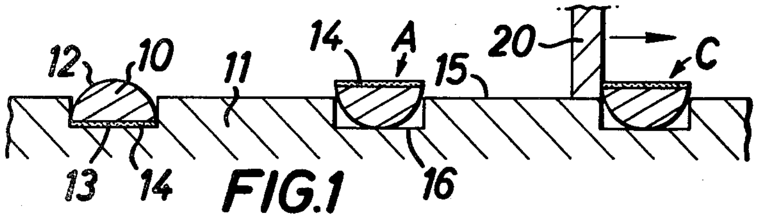
FIG. 1 is a section through the surface of a stencil.

An article 10 to be applied to a stencil or other carrier member 11 comprises an upper decorative portion 12 and a lower base 13 carrying a layer of heat-sensitive adhesive 14 which is typically a polyethylene coating. The article is shaped such that the base 13 is the largest single planar dimension and the article tapers and is otherwise shaped and configured on the upper portion 12.

The stencil 11 comprises a substantially planar surface 15 having a plurality of blind holes 16 which together define a pattern for the transfer to be formed. Each blind hole 16 is adapted to accommodate an article 10 and resting upon its base coating 14 with the upper portion 12 extending above the planar surface 15. In this way, when seated on its base, the article is disposed in the blind hole in a stable configuration and the application of pressure or friction to the upper surface 12 of the article when seated in the hole will not disturb the article from the hole.

Figure 2:
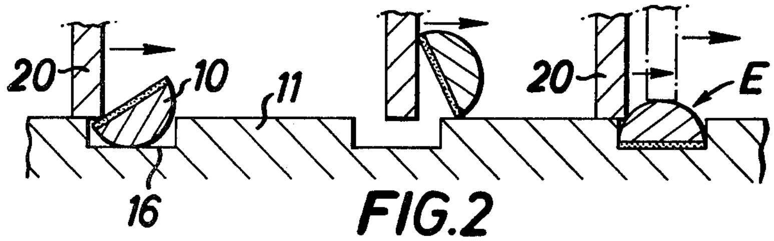
FIG. 2 is a section through the stencil of FIG. 1 showing the articles in different orientations.

If, however, the article is disposed in the bore or hole 16 with its base coating 14 uppermost, as shown in A in FIG. 1, then, because the rounded or shaped upper surface 12 is within the bore or hole 16, the article is unstably accommodated within said hole and the application of lateral pressure, as shown in C by means of, for instance, the squeegee-like action of the wall of the container 20, will cause progressive tilting of the article so that as the squeegee wall of container 20 moves across bore 16, the article 10 tilts and is eventually removed from the bore (see FIG. 2). With the article in the stable configuration (see diagram E of FIG. 2), the squeegee wall 20 merely rides over the upper surface 12 and leaves the article disposed in the hole 16.

Figure 3:
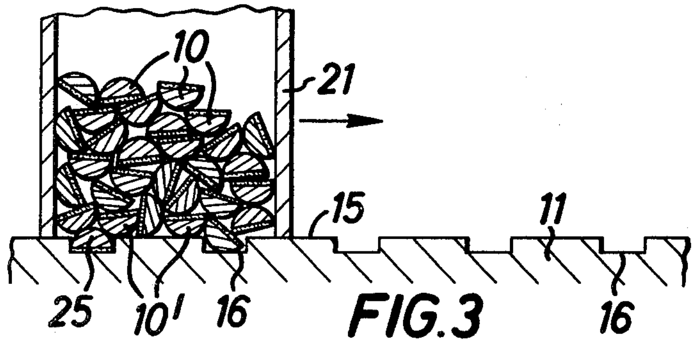
FIG. 3 is a section through the stencil of FIG. 1 showing the position and location of the articles within holes in the stencil.

In operation in accordance with the present invention, a stack of articles is accommodated within a container or reservoir 21, the plurality or stack of articles 10 being several layers above the surface 15 of the stencil in order to provide a downward pressure on the lowermost articles 10' in the reservoir 21. Lateral movement of the reservoir 21 over the surface 15 of the stencil results in the squeegee action which will serve to remove unstably accommodated articles from holes 16 (see FIG. 3) whilst stably disposed articles, for instance 25, will be retained within their hole 16 and remain undisturbed. In this way, holes within the path of moving reservoir 21 are filled with stably located and disposed articles.

Figure 4:
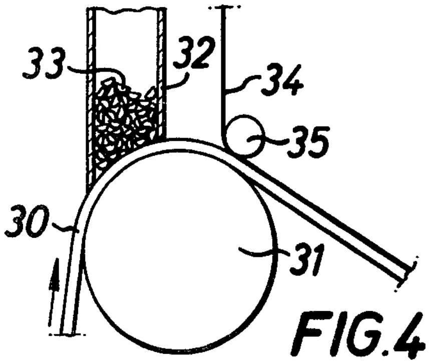
FIG. 4 illustrates an embodiment of apparatus for the continuous application of articles to a stencil in accordance with the present invention.

In one embodiment of the present invention a flat or series of flat planar stencils may be loaded by means of manually operable reservoirs 21 to load the stencils and thereafter the carrier sheets may be applied in the usual way. In accordance with the invention, however, it is desirable that the stencil is continually loaded. In consequence, the apparatus of FIG. 4 may be employed whereby the stencil 30 having the holes adapted to accommodate the articles is formed of a flexible material which passes around a drum 31. On the upper portion of the drum there is disposed a reservoir 32 accommodating a stack of articles 33 therein in amounts sufficient to provide considerable downward pressure on the articles juxtaposed the stencil per se. Movement of the stencil 30 about and with drum 31 results in passage of the stencil surface past the open portion of reservoir 32 and the article becomes oriented and accommodated within the holes in the stencil surface in the manner described above. A carrier sheet 34 is fed around roller 35 and urged into contact with the exposed surface 12 of each article 10 on the stencil. The contacting surface of carrier sheet 34 includes the pressure-sensitive adhesive. The stencil 30 and carrier sheet 34 travel together to a second roller 35 and the carrier sheet is peeled off, taking with it the articles from the stencil so that the stencil pattern is now carried by the carrier sheet in the form of articles.

The articles are preferably small decorative glass, metal or plastic particles coated on one surface with a polyethylene coating to serve as a fusible adhesive. The particles, which have the shape of cut diamonds or hemispheres and consist of glass, metal or plastics are shaped to have a broad base and a facet-like topside. The base of the diamond shape is covered with a layer of polyethylene coating.

The carrier sheet 34 comprises a transparent sheet of plastics material having a melting point greater than 210° C., typically a non-woven fabric made from regenerated cellulosic fibres bonded together by non-thermoplastic binder and subjected to a caustic treatment. The nonwoven fabric is coated with a pressure-sensitive adhesive formed of an aqueous paste containing 800 parts of butylacrylate and 600 parts of carboxymethylcellulose as a thickening agent. A proprietary adhesive such as that commercially available under the trade name "Cellux 600" manufactured by Feldmuchle A. G. of Rorschach, West Germany. The pressure-sensitive adhesive is applied to a surface of the carrier fabric at a rate of 60 grams per square meter and is sufficient to provide adequate bond strength between the cellulose sheet and the articles per se. The carrier sheet was pressed against the stencil leaving roll 31 of FIG. 4 in a continuous calender press equipped with a hard roll 31 and a very soft roll formed of neoprene rubber having a Shore Hardness of 10. The facet-like top sides of the decorative particles became embedded in and secured to the carrier material and the base of the decorative particles were disengaged from the stencil. The carrier sheet 34, together with the particles leaving the calender press is parted from the stencil and a backing sheet, e.g. a soft plastic film subsequently applied to the adhesive side of the carrier sheet. The edges of the backing sheet may be bonded to the carrier sheet by means of decorative tape and a laminate may be formed so that the pattern of particles to be transferred to a fabric material is sandwiched between the backing sheet and the carrier sheet per se.

The edge tapes may carry advertising matter or instructions in the use of the articles.

In use, the backing sheet is stripped from the transfer and the carrier sheet is laid, adhesive side down, on to the fabric to be decorated, which in the particular example was a cotton knit fabric. The transfer and fabric were then placed in the jaws of a calender press and the press operated to effect the transfer. The temperature of the press was 150° C. and the exposure was for a period of 20 seconds at a pressure of 50–100 grams per square centimeter.

The temperature of the press, during this period, was transmitted to the polyethylene layer on the base of each of the articles of the transfer and the polyethylene layer was melted sufficiently to flow into the surfaces of the fabric juxtaposed thereto. After the fusion process was completed, the materials were removed from the press and allowed to cool to room temperature. The carrier sheet was then peeled from the fabric to be decorated, leaving the particles firmly secured to the fabric. The bond strength between the carrier sheet materials and the decorative articles was substantially lower than the bond strength between the fabric and the articles themselves with the result that separation of the carrier sheet and the articles occurred readily.

It will be appreciated from the foregoing that transfers can be readily produced in accordance with the present invention. The loading of the holes in the stencil can be assisted by the use of differentially weighted particles, by vibration of a stack of particles while disposed over the stencil surface, by the use of vacuum, by the inclusion of a ferromagnetic portion to each particle and the application of a magentic field to the surface. The application of lateral friction and vertical pressure to the particles disposed on the surface taken in combination with the asymmetric nature of the particles results in steady loading of the stencil prior to application of the carrier sheet.

I claim:

1. A method of filling blind holes in the upper surface of a stencil with decorative articles to define a particular pattern comprising the steps of, firmly supporting said stencil with said blind holes therein opening in said upper surface, positioning a container filled with a stack of discrete decorative articles each of which includes a base portion having at least one planar surface area and an upper portion in an asymmetric configuration with respect to a horizontal plane extending between said base portion and said upper portion to thereby apply localized pressure to said decorative articles in said container, moving said container to move said stack of articles relative to said stencil upper surface for locating a decorative article in each of said holes in a fixed orientation with the upper portion of said article extending above said stencil upper surface and the base portion of said article located within said blind hole whereby lateral translational movement of said decorative articles and the associated pressure assists each article in said hole to adapt said fixed orientation.

2. A method as claimed in claim 1, further wherein said planar surface area of said discrete decorative articles includes a layer of heat sensitive adhesive material.

3. A method as claimed in claim 1, further wherein said localized pressure on said decorative articles is constituted by the weight of the articles in said container.

4. A method as claimed in claim 1, further wherein each said article is formed with a ferro-magnetic base portion and said stencil is subjected to a magnetic field to thereby assist orientation of said articles in said blind holes.

5. A method as claimed in claim 1, further wherein each said article has a weighted base portion to assist orientation of articles in said blind holes.

* * * * *